(12) United States Patent
Möhler et al.

(10) Patent No.: US 8,633,430 B2
(45) Date of Patent: Jan. 21, 2014

(54) METHOD FOR GENERATING IMAGES WITH AN EXPANDED DYNAMIC RANGE AND OPTICAL DEVICE FOR CARRYING OUT SUCH A METHOD, IN PARTICULAR A LASER SCANNER MICROSCOPE

(75) Inventors: Gunter Möhler, Jena (DE); Dietmar Schmidt, Bibra (DE); Oliver Holub, Jena (DE)

(73) Assignee: Carl Zeiss Microscophy GmbH, Jena (DE)

( * ) Notice: Subject to any disclaimer, the term of this patent is extended or adjusted under 35 U.S.C. 154(b) by 111 days.

(21) Appl. No.: 13/435,628

(22) Filed: Mar. 30, 2012

(65) Prior Publication Data

US 2012/0205519 A1    Aug. 16, 2012

Related U.S. Application Data

(63) Continuation of application No. PCT/EP2010/005263, filed on Aug. 27, 2010.

(30) Foreign Application Priority Data

Sep. 30, 2009    (DE) .......................... 10 2009 043 746

(51) Int. Cl.
*H01L 27/00* (2006.01)
(52) U.S. Cl.
USPC .................................... 250/208.1; 250/201.3
(58) Field of Classification Search
USPC ............ 250/208.1, 201.3, 201.5, 214 R, 216, 250/458.1, 459.1, 461.1, 461.2; 600/300, 600/407–409; 356/317–328, 342, 445
See application file for complete search history.

(56) References Cited

U.S. PATENT DOCUMENTS

| | | | |
|---|---|---|---|
| 7,009,699 B2 * | 3/2006 | Wolleschensky et al. | .... 356/317 |
| 7,679,875 B2 | 3/2010 | Schneider | |
| 7,859,673 B2 | 12/2010 | Moehler et al. | |
| 7,911,589 B2 | 3/2011 | Siercks | |
| 2003/0183754 A1 | 10/2003 | Wolleschensky et al. | |
| 2005/0133692 A1 | 6/2005 | Watanabe et al. | |
| 2008/0008479 A1 | 1/2008 | Moehler et al. | |

FOREIGN PATENT DOCUMENTS

| | | |
|---|---|---|
| DE | 10110925 A1 | 9/2002 |
| DE | 10253108 A1 | 5/2004 |

(Continued)

OTHER PUBLICATIONS

Bell, Andre A. et al.; High Dynamic Range Images as a Basis for Detection of Argyrophilic Nucleolar Organizer Regions Under Varying Stain Intensities; IEEE International Conference on Image Processing; Oct. 18, 2006; pp. 2541-2544; Institute of Imaging & Computer Vision; Aachen University, Germany.

*Primary Examiner* — Que T Le
(74) *Attorney, Agent, or Firm* — Westerman, Hattori, Daniels & Adrian, LLP

(57) ABSTRACT

Method and apparatus for generating an at least two-dimensional image of at least part of a sample. The method involves scanning the sample. Acquiring at least one light signal by an optoelectronic detector for different areas of the sample. Converting the light signal into an electrical signal. Distributing the electrical signal onto several parallel evaluation channels whose signal evaluations differ from each other so that their dynamic ranges are different. Generating a result signal in each evaluation channel. Selecting at least one of the result signals as a function of one of the result signals in order to generate the image for the sample range concerned. It is also possible to generate one intermediate result signal for each channel, typically from the respective actual result signal and one or more other sources. Thus the signal selection depending on both the result signals and the intermediate result signals are possible.

17 Claims, 3 Drawing Sheets

(56) References Cited

FOREIGN PATENT DOCUMENTS

| | | |
|---|---|---|
| DE | 102006030530 A1 | 1/2008 |
| DE | 102007004598 A1 | 8/2008 |
| DE | 102007031774 A1 | 1/2009 |
| EP | 1761071 A1 | 3/2007 |
| WO | 0201201 A1 | 1/2002 |
| WO | 2008009387 A1 | 1/2008 |

* cited by examiner

METHOD FOR GENERATING IMAGES WITH AN EXPANDED DYNAMIC RANGE AND OPTICAL DEVICE FOR CARRYING OUT SUCH A METHOD, IN PARTICULAR A LASER SCANNER MICROSCOPE

CROSS-REFERENCE TO RELATED APPLICATIONS

The present patent application is a Continuation of International Application No. PCT/EP2010/005263 filed Aug. 27, 2010, published in German, which is based on, and claims priority from, German Application No. 10 2009 043 746.0, filed Sep. 30, 2009, both of which are incorporated herein by reference in their entireties.

BACKGROUND OF THE INVENTION

1. Field of the Invention

The invention relates to a method for generating an at least two-dimensional image of at least a part of a sample. The optical devices can be, for example, telescopes, microscopes, material-testing devices and other analyzing devices. The origin of the light is inconsequential, so that the invention can serve, for example, in conjunction with scintillation for the detection of ionizing radiation. However, the invention is preferably used for the detection of fluorescence.

2. Related Art

Microscopic examinations with fluorescent dyes result in many instances in heterogeneous distributions of concentration in the samples to be examined. This can concern desired attachments such as are generated, for example, for the structured marking in cellular samples or tissue samples by directly applied—for example, specific antibody dyes—or expressed fluorescent dyes such as, for example, GFP. Also, additional undesired inhomogeneities are frequently included, for example, by autofluorescence and heavily fluorescing tissue inclusions.

Heavily heterogeneous fluorescence distributions in a microscopic image have the result, like great differences of brightness in conventional photography, that when using the dynamic range of the detector in an individual photograph only a part of the image information can be detected. In order to be able to resolve contrast details in bright image areas (with high average light intensities), the detector must not be saturated. To this end the photographing time (also designated as exposure time or integration time) must be selected to be short. However, as a consequence dark image areas (with low average light intensities) are recorded only with insufficient signal-to-noise ratio (SNR), that is, with poor contrast. Inversely, a longer exposure time does make possible the contrast-rich photographing of dark image areas but results in an overcontrol (low contrast) of the bright image areas.

Dark as well as bright image areas can be separately measured with a good SNR ratio by a multiple photographing of individual images with different exposure times. They can then be combined to a total image with expanded dynamics (Engl. "High Dynamic Range Imaging"; HDRI; A. Bell et al.: "High Dynamic Range Images as a Basis for Detection of Argyrophilic Nucleolar Organizer Regions Under Varying Stain Intensities", Proceedings of IEEE International Conference on Image Processing, ICIP 2006, 2541-2544). Instead of different exposure times, in the case of fluorescence different excitation intensities can be used.

It is known from U.S. Pat. No. 7,859,673 B2, whose disclosed content is incorporated herein in its entirety, to use a detector module in a laser scanning microscope (LSM) in which module a light signal strikes an individual optoelectronic converter, where it is converted into an electrical signal that is subsequently divided into several parallel evaluation channels. A signal evaluation is carried out in each evaluation channel, which evaluation is different from the signal evaluations for the other evaluation channels, and that generates a result signal. One or more of the result signals are selected and outputted using a given, variably adjustable selection criterion. Thus, several individual images with different acquisition methods can be taken by simply switching the evaluation channel used for image generation.

However, the sequential acquisition of several individual images is expensive and slow. In particular, it is problematic in the observation of fluorescence since the intensity of the fluorescence changes between the acquisitions by the fading of the fluorophones. Especially in the case of living samples the multiple acquisition results in a high beam load, especially in the case of scanning methods such as in laser scanning microscopy. In addition, the sequential acquisition is not suitable for the observation of dynamic operating sequences.

DE 102 53 108 A1 describes a device that realizes an electrical signal division onto two evaluation channels by means of a high pass/low pass combination. Here, only a part of the detector information (that is, of the electrical signal) is made available for each detection channel. This can limit the possible evaluation methods or lead to increased expenses for the reduction of error recognition. For example, the average steady component is a function of the counting frequency in the high pass branch. In addition, the determination of the boundary frequencies of the high pass/low pass combination necessary for the development time renders difficult the adaptation to new applications or detection methods during the service life of the device. Moreover, the high pass/low pass combination leads to non-linear amplitudes and phase distortions that can have a disadvantageous effect in particular in frequency area methods (Engl. "frequency domain").

Alternatively to the sequential acquisition of individual images, EP 1 761 071 A1, for example, teaches the simultaneous acquisition of individual images with different contrast ranges by asymmetric optical beam division. However, this obligatorily requires a division of the light signal onto several channels and several optoelectronic detectors that represent additional noise sources. The SNR is further reduced on account of the lesser signal strength in the individual channels due to the division.

The invention is based on the problem of indicating a method and an optical device of the initially cited type that make it possible to generate images with a broader dynamic range with low cost in a short time.

SUMMARY OF THE INVENTION

The invention provides that in order to generate the image for the sample range concerned, at least one of the result signals is selected as a function of one of the result signals and/or as a function of an intermediate result signal of an evaluation channel. Thus, during the generation of the image evaluation channels that are different for different image elements are selected and used to generate the intensity value of the image element concerned. If several result signals are selected, they are preferably added to exactly one representative result signal.

Each sample area for which a selection is carried out preferably corresponds to a particular image element, pixel, or picture element of the image to be generated. All sample ranges (and in the case of the visualization the image elements) are advantageously congruent here.

An intermediate result signal is in the sense of the invention a signal that is made available in time from an evaluation channel before the result signal is outputted, for example, in the framework of the so-called sub-pixel analysis (SPA), that is, of the evaluation of real-time subunits of the electrical signal. In particular, the intermediate result signals can be such real-time subunits of the electrical signal or magnitudes derived from them.

At least one (up to all) of the result signals and/or at least one (up to all) of the intermediate result signals are advantageously evaluated for the selection. During the evaluation a degree of the suitability of the particular result signal/intermediate result signal for the generation of an image with expanded dynamic range is preferably determined. As a result, a dynamically broadened image with the greatest possible dynamic range can be determined.

The range-individual (preferably pixel-individual) selection from the different signal evaluations using one or more result signals makes it possible to use the signal evaluation with the dynamic range optimal for the sample range concerned for different image elements. As a consequence, the resulting image receives an expanded dynamic range that results from the combined amount of the (narrower) dynamic ranges of the individual image elements. The total noise in the image to be generated can therefore be reduced by pixel noise minimization to the noise of the particular lowest noise acquisition method/evaluation method. A time-consuming sequential acquisition of several individual images can be eliminated. Only a single optoelectronic detector is required whose total dynamic range can be utilized.

The selection can advantageously take place during the scanning, in particular in real time. As a result, for example, a detector module in which the evaluation channels with an evaluation unit are arranged can carry out the selection in an autarkic manner and forward only the selected result signal and the sum of the selected group of result signals to a higher-order control computer. As a consequence, only one transmission bandwidth is needed for a single evaluation channel. However, it is equivalent (given a sufficient transmission bandwidth) to at first forward all result signals to a control computer that carries out the selection only after the end of the scanning procedure or "scanning pass", in particular in a larger distance in time.

Preferably exactly one scanning pass is carried out in order to generate the image with a dynamic range that corresponds to a union of the dynamic ranges of several evaluation channels. This permits a high contrast range of the image to be produced with maximal protection of the specimen.

The selection is successful with especially low cost in which the selection of the result signal takes place for each sample range using a particular result signal that indicates a photon number, and/or using a particular intermediate result signal that indicates a photon number. Only one comparison with one or several given threshold values needs to be carried out in order to select precisely one evaluation channel or one group of evaluation channels whose result signals are added.

In a more extensive embodiment the selection can take place exclusively as a function of one or more of the result signals and/or of one or more of the intermediate result signals. This simplifies and accelerates the selection.

According to a preferred embodiment, one signal-to-noise ratio is determined for each result signal for each sample range and the result signal is selected and outputted that has the lowest signal-to-noise ratio. In this manner the best-possible image as regards the total contrast range can be produced with low cost.

A further development of the invention provides that a gain of the detector or an excitation light intensity of a light source is adjusted as a function of one of the result signals and/or as a function of an intermediate result signal. As a consequence, any overloading of the detection can be avoided. The gain of the detector can be adjusted in case of a photomultiplier tube (PMT), for example, by switching away one or more dynodes or by a changing of the high voltage of the dynode.

The invention comprises control units and computer programs that are adjusted for carrying out a method in accordance with the invention, in particular data carriers with such a computer program. The invention furthermore comprises an optical device with a detection beam path that comprises a scanning unit and an optoelectronic detector for converting a light signal into an electrical signal, with several evaluation channels whose signal evaluations differ, with a division circuit for distributing the electrical signal onto the evaluation channels, and with such a control unit. In particular, the optical device can be a laser scanning microscope.

In sum, the invention allows an image to be generated with a previously unattained signal-to-noise ratio (SNR) (at given excitation light conditions and given scanning rate, that is, given pixel integration time) over the entire dynamic range of a photodetector by means of special electronic data acquisition (in particular using an apparatus in accordance with U.S. Pat. No. 7,859,673 B2) and evaluation in a single scanning pass. However, the invention is not limited to embodiments with only exactly one scanning pass.

Images with expanded dynamic range generated in accordance with the invention can be further processed in particular in traditional methods for expanding the dynamic range in order to achieve an even greater dynamic range. In this manner, for example, dynamically expanded images of different detector types that have disjunctive dynamic ranges can be combined.

Also, a series of images with a dynamic range expanded in accordance with the invention and with different integration times or excitation light intensities can be acquired and combined to an HDR image. For example, in such an embodiment instead of a selection of the evaluation channel by pixels the channel selection can also take place for entire individual images that are subsequently combined by pixels to a dynamically expanded image. Then, for example, individual images with short integration times are completely processed in an evaluation channel with single photon counting; SPC and individual images with longer integration times are processed in an oversampling channel. In an alternative embodiment the excitation intensity as well as the exposure time can be modified simultaneously or sequentially for expanding the dynamic range. To this end the individual pixels can be evaluated as regards their signal quality. If, for example, the measuring with a very long integration time in a pixel did not generate a good signal, an additional measuring with a higher laser intensity can produce a better signal and thus contribute to the expansion of the dynamic range.

BRIEF DESCRIPTION OF THE DRAWINGS

The invention is explained in detail in the following using exemplary embodiments. In the drawings.

In all drawings coinciding parts have the same reference numbers.

DETAILED DESCRIPTION OF THE PREFERRED EMBODIMENTS

Figure 1:
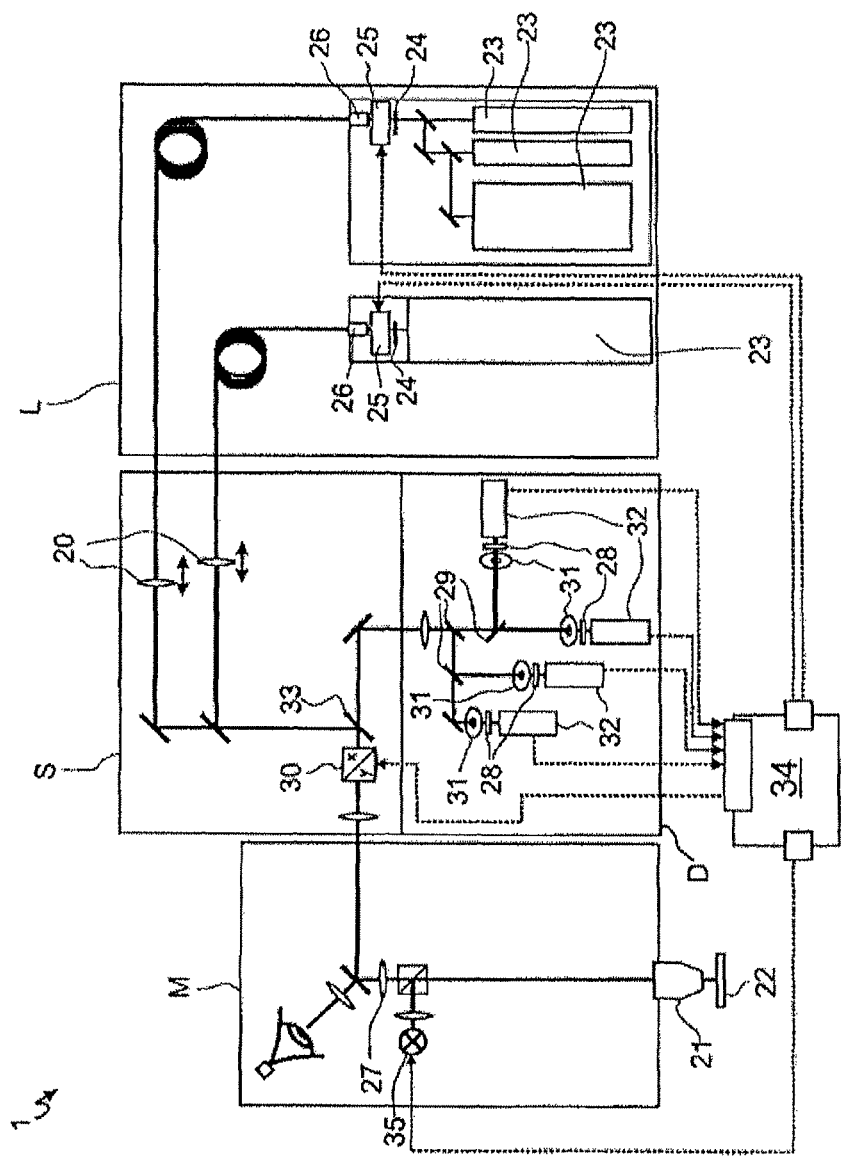
FIG. 1 is a schematic drawing of a laser-scanning microscope for carrying out the method of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 schematically shows a laser scanning microscope 1 whose control unit 34 is arranged for carrying out the method in accordance with the invention. The LSM 1 is composed in a modular manner from an exposure module L with lasers 23, a scanning module S, a detection module D and the microscope unit M with the microscope lens 21.

The light of the laser 23 can be influenced by light flaps 24 and attenuators 25, for example, an acusto-optically tunable filter; AOTF of the control unit 34 before it is fed via optical fibers and coupling lenses 20 into the scanning unit S and combined. It passes via the main beam divider 33 and the X-Y scanner 30, that comprises two galvalometric mirrors (not shown), through the microscope lens 21 to the sample 22 where it illuminates a focus volume (not illustrated). In addition to the lasers 23 a light source 35 can be used for wide-field illumination (independently of the adjustment of the scanner 30).

Light reflected from the sample or emitted fluorescent light passes through the microscope lens 21 and further via the scanner 30 through the main beam divider 33 into the detection module D. The main beam divider 33 can be constructed, for example, as a dichroic color divider. The detection module D comprises several detection channels with a hole diaphragm 31, a filter 28 and a photomultiplier as detector 32 that are separated by color dividers 29. Instead of hole diagrams, even slot diagrams (not illustrated) can be used, for example, in the case of linear illumination. The confocal hole diaphragms 31 serve for the discrimination of sample light that does not stem from the focus volume. Therefore, the detectors 32 detect exclusively light from the focus volume. Alternatively or additionally to PMT other detector types can be used, for example, avalanche photodiodes (APD), or site-resolving systems such as CCD cameras. The site resolution is necessary in particular in conjunction with spectral splitting and/or with a linear focus volume. The detectors 32 comprise in this example electronic evaluation components (not shown in detail here). In other embodiments (not shown) the electronic evaluation components can be set off from the detectors 32, and in particular they can be arranged outside of the detection module D.

The confocally illuminated and acquired focus volume of the sample 22 can be moved by the scanner 30 over the sample 22 in order to take an image with pixels in that the galvalometric mirrors of the scanner 30 are rotated in a purposeful manner. The movement of the galvanometric mirror as well as the switching of the illumination by the light flaps 24 or the attenuator 25 are directly controlled by the control unit 34. The data acquisition by the detectors 32 also takes place by the control unit 34. The evaluation unit/control unit 34 can be, for example, a customary commercial electronic computer.

Different noise characteristics are to be considered as a function of the optoelectronic detector used during the image acquisition, for example, the unavoidable readout noise of CCD cameras. Primarily two noise sources are to be considered for LSM with PMT detectors: The photon shot noise and the detector dark noise, which also includes the noise of the electronic components. The main source of the dark noise is the thermal emission of electrons from the photocathode and the first dynodes. The thermal noise can be reduced so far for the photocathodes with a small detector area used in microscopy by cooing that it practically plays no large part any more. The noise of the electronic components cannot be reduced in this manner.

In practice, two detection methods are used in PMT photodetectors, the (digital) single photon counting or the (analog) integration of the anode current with subsequent analog-to-digital conversion:

In bandwidths below 100 MHz (10 ns) the electrical signal of the PMT can be detected on the anode as a series of individual pulses and be digitally processed. During the scanning in the framework of a fluorescence measuring in an LSM counting rates of 200-1000 fluorescence photons per second are produced on the PMT at typical individual pixel integration times of 1-2 μs. This requires the use of signal preamplifiers and constant fraction discriminators; CFD). The amplitude of the single photon pulses from PMT varies on account of random fluctuations of the detector strengthening from pulse to pulse because a different number of electrons is driven out from the photocathode for each incident photon. The single photon counting has the advantage that any noise from the electronic components that is still present can be separated from the electrical signal by a discriminator threshold value, as a result of which the SNR ratio and the contrast are elevated. The analog amplitude distribution is converted into a delta function at amplitude one—in other words, into a binary representation. The single photon counting is normally considered as a detection method of the selection for low light intensities.

As the light intensities increase, the intervals between the photons striking the PMT become so short that the single photon pulses (typical pulse width 2 ns) overlap each other and generate a continuous signal form. This continuous anode current can be processed by conventional analog-to-digital converters. The entire dynamic range of the PMT can be utilized by the combination of these two detector methods.

Figure 2:
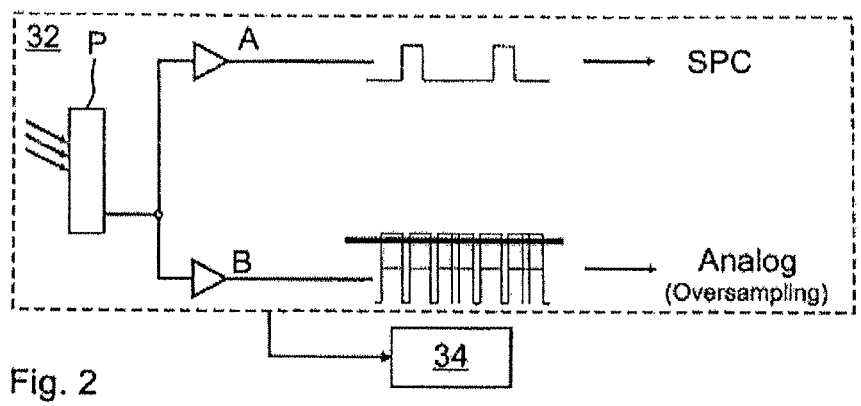
FIG. 2 is a schematic drawing of the simultaneous signal evaluation in two evaluation channels with different signal evaluations, FIG. 3 graphically shows exemplary dynamic ranges of individual evaluation methods, FIG. 4 graphically shows the principle of the range-wise/pixel-wise signal optimization for expanding the dynamic range of the image to be generated using a generated image.

FIG. 2 shows an exemplary embodiment of the electronic evaluation components of the detectors 32 in detail. The electrical signal emitted by the anode of the PMT P (in general: from the photosensitive optoelectronic converter P) is divided up and distributed onto two parallel evaluation channels A/B. The parallel evaluation channels A, B have a different dynamic range, for example, a photo counting takes place in evaluation channel A and in evaluation channel B an oversampling with analog-to-digital conversion (ADC) as analog detection. Both acquisitions A, B generate a result signal. The result signals are outputted, for example, to the control unit 34 for further processing (selection for the generation of a dynamically expanded image). Alternatively, the selection in accordance with the invention can take place in the electronic evaluation components of the detectors 32, so that at each point in time only exactly one of the result signals (or exactly one sum of several result signals) is outputted to the control unit 34.

Figure 3:
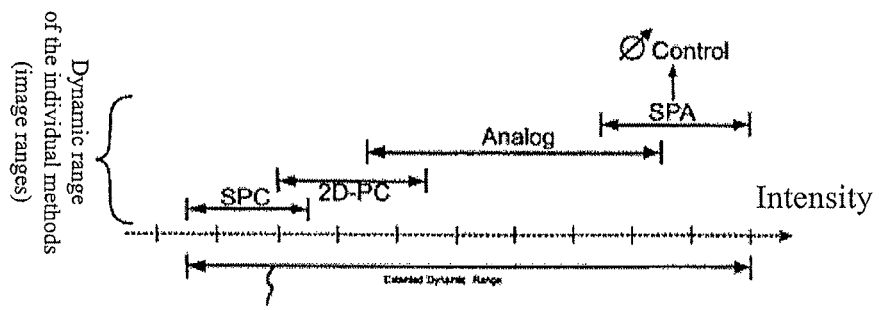

FIG. 3 schematically shows the dynamic ranges of different evaluation methods. The range-wise selection of the optimal evaluation method or methods can bring about the combination of these value ranges for the entire image to be generated. This is indicated in the lower range as the total dynamic range of an image generated in accordance with the invention.

Figure 4:
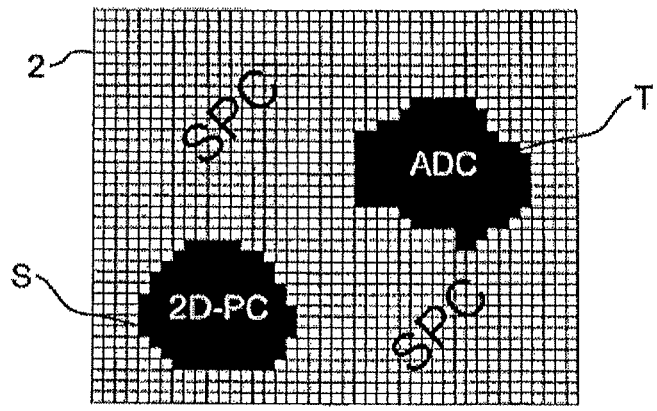

FIG. 4 illustrates the principle used by the invention for the generation of images with an expanded dynamic range. It is based on the one hand on the reduction of the total noise in the generated image 2 by local (range-wise; preferably pixel-wise) minimization of the total noise to the particular acquisition-/evaluation method (combination of the dynamic ranges of different, simultaneously operating evaluation channels) with the lowest noise and on the other hand on the avoidance of the overcontrolling of the electronic detection components with and without influencing the detector and the illumination. Both are successful by means of the selection of the optimal evaluation method for the concerned sample area (image range; preferably individual pixels) using the result signals emitted in parallel in the different evaluation channels. To this end the result signals of all evaluation channels are preferably determined simultaneously and subsequently, for example, as regards their suitability for the generation of an image with an expanded dynamic range. The selection of exactly one result signal as intensity value for the sample range concerned (for example, one pixel) takes place as a function of this evaluation. It is also possible to select the result signals of several evaluation channels as being suitable based on the evaluation and sum them to exactly one result signal that is used further as intensity for the concerned image area and is preferably outputted.

In this manner the higher contrast that is obtained in the case of light-poor measurements by single photon counting can be used to expand the lower dynamic range in contrast to the analog operating type which, however, for its part makes possible a complete utilization of the great dynamic range of the PMT. For example, the photon counting rate that is present in the shortest possible measurable time interval is determined as evaluation magnitude using the result signals. Then, a decision can be made using this magnitude about which channel (or which channel group sum) should be used to determine the intensity of the particular pixel. In the case of light-poor pixels the channel with single photon counting is used in a suitable manner. At higher photon counting rates the analog channel is used.

In the illustrated instance three parallel evaluation channels were available: single photon counting (SPC), two-dimensional photon counting (2D-PC) and oversampling (ADC). In the image range S an average fluoresce intensity was present and in image range T a high one. After a pixel-wise evaluation of the result signals, for example, the intensities of the pixels of the image range S were determined exclusively by two-dimensional photon counting and the intensities of the pixels of the image range T exclusively by oversampling, while the intensities of the pixels of the remainder R of the image 2 (that is, between the image ranges S and T and around them) were determined based on the low fluoresce intensity there with single photon counting.

Figure 5:
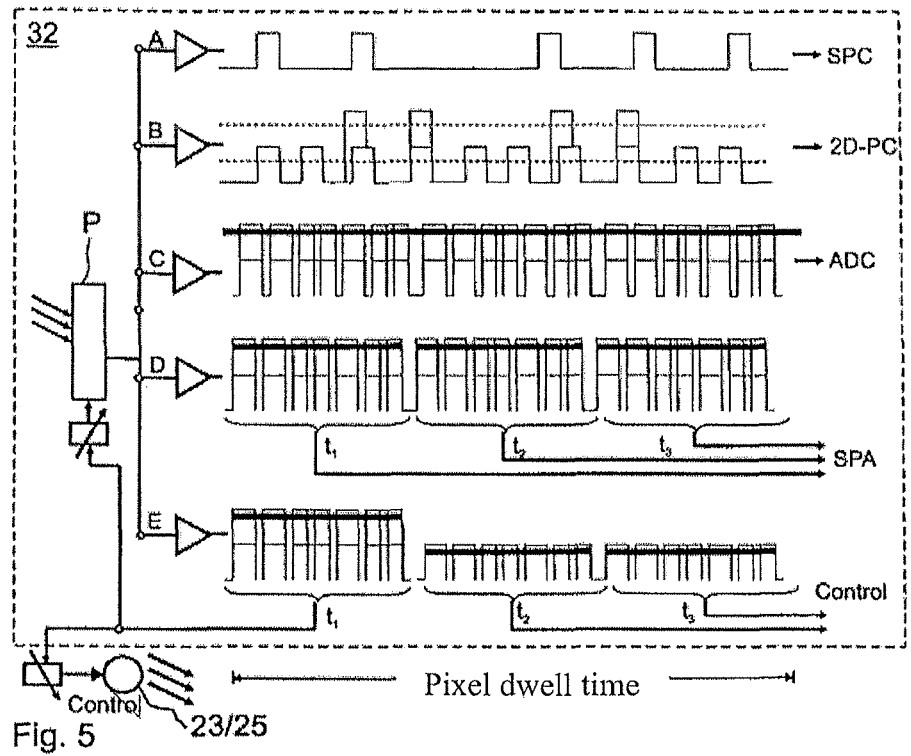
FIG. 5 shows a schematic view of the simultaneous signal evaluation in five evaluation channels with different signal evaluations.

FIG. 5 shows an exemplary signal course in time that is acquired in order to generate a single pixel. The intensity of the single pixel during the scanning becomes, for example, in a typical pixel dwell time of 1.2 µs as pixel integration time.

The signal emitted by the photo receiver P, for example a PMT, is divided in this embodiment into five amplified single signals and processed in the channels A-E. Channel A is provided with electronic components for single photon counting (hardware: CFD), see for example DE 2006 030 530 A1. Channel B is provided coupled for single photon counting with multiple threshold analysis, also designated as two-dimensional photon counting. Refer for the disclosure of the 2-D-PC to DE 101 10 925 A1. Channel C runs analog detection (oversampling; hardware: analog-to-digital converters, capacitors), see, for example, DE 2006 030 530 A1. Channel D reads out the entire signal in a subpixel analysis (SPA) in the pixel integration time in several partial ranges (three ranges each 400 ns shown). Channel E regulates down either the detector gain or correspondingly the excitation light intensity of the excitation light source 23 (or 25) (control) in the case of too high a photon counting rate in the smallest possible readout range in time. For the single pixel the signal emitted as image intensity is generated in accordance with the analysis method selected using the result signals and from one or a sum of several of the channels A to D.

For example, any type of statistical analysis of the result signals or intermediate result signals can be carried out for the selection in order to determine the best-possible processing method (evaluation, in particular by pixel-wise determination of the particular degree of the suitability of the evaluation channels for an image with expanded dynamic range) and/or for extracting additional information from the data. In the simplest case the analysis will consist only of the determination of the photon counting rate in the particular pixel and a corresponding evaluation channel selection (and association to the pixel, that is, output of the particular result signal as intensity value) will take place. At low photon counting rates in a pixel (photon counting rate below a first threshold) channel A is used. At elevated photon counting rates (typically 1 million photons/sec) between the first threshold value and a second threshold value channel B is switched in (summing of A and B). For high photon counting rates above the second threshold value only channel C is required, as a result of which the entire upper detector dynamic range can be utilized. If a saturation occurs in the single pixel value, the detector linearity can possibly still always be ensured if, instead of the summing up of the subpixel intermediate result signals in the time windows $t_1$ to $t_3$ in channel D, for example, only the intermediate result signal of the window $t_1$ is outputted as result signal (provided that there is still no complete overcontrolling in this range).

In addition to the selection of one or more evaluation channels the control unit 34 can, if it identifies an overcontrolling of the photon counting rate, regulate down the detector gain and/or the excitation light intensity in order to improve the image contrast. The excitation light intensity can be regulated, for example, by the attenuator 25 in a time magnitude on the order of 1 µs. In diode lasers it can be directly controlled by the diode current. For the adaptation of the detector gain factor a switching away of dynodes or a changing (tracking) of the dynode high voltage can take place. The detector gain can be reduced by a rapid switching over in a time range of less than 1 µs between the anode and another dynode (see Hamamatsu PMT Handbook, S. 98: "Anode Sensitivity Adjustment Circuits", publication date unknown).

The adaptation of the detector gain is basically known from DE 2007 704 598 A1 but only as protection circuit for a PMT, not for preventing the overcontrolling. During the scanning procedure the subsequent regulating of the dynode high voltage must take place in a time range of microseconds and less in order to be able to be precisely adjusted in accordance with the pixels. In as far as at least a reaction time of microseconds is achieved, at least the cutting out of the PMT by heavy overcontrolling can be avoided and a correct image acquisition could take place by combination with a second image acquisition for which the high voltage switching points had previously been calculated pixel-wise.

The electronic evaluation components (evaluation channels A-E) are illustrated only by way of example as part of the detector 32. They can alternatively be arranged in part or completely outside of the detector 32. The same applies for the electronic control components or electronic regulating components of the PMT P (in general: of the optoelectronic converter P).

The regulation of the excitation light source 23/25 as a function of the intermediate result signals or result signals of the channel E can be carried out by a control circuit or control loop or by the control unit 34 or (as illustrated) by an additional auxiliary control unit at a distance from the detector 32.

Figure 6:
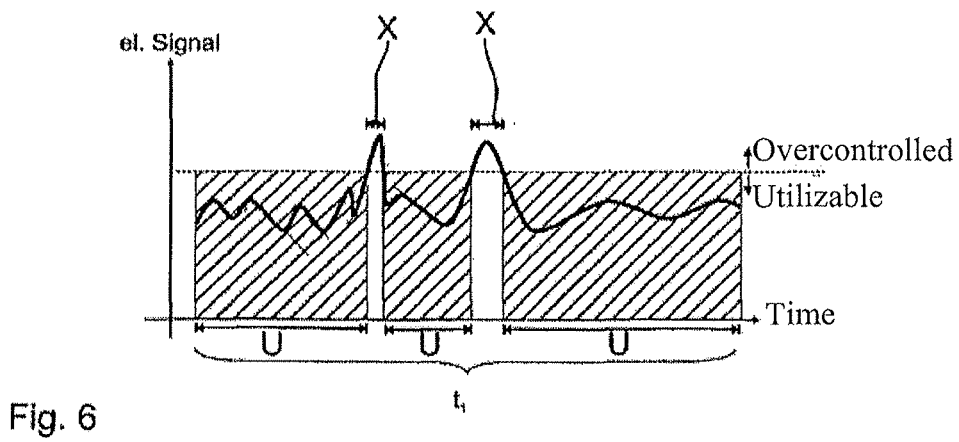
FIG. 6 is a schematic drawing of a subpixel analysis.

In the case of a partial overcontrolling also in the subpixel time intervals of an SPA evaluation channel at least a significant average value can still be calculated with the read-out, not overcontrolled values. FIG. 6 shows this variant of the subpixel analysis by way of example for the time window $t_1$ of the signal course of channel D in FIG. 5. In the time window $t_1$ the electrical signal of the photodetector 32 is subdivided by the overcontrolled sections X into three usable sections U (hatched). For the intermediate result signal of the time window $t_1$ the electrical signal is integrated via these three sections U and an average value formed over the integration time. It is then used in a regular manner for forming the result signal of the channel D and can thus flow into the selection of the most suitable evaluation channel.

An additional expansion of the dynamic range can be achieved by the combination of different detector with different sensitivities and dynamic ranges. However, it also has disadvantages such as higher component costs and optical integration and alignment. The dynamic range can also be expanded by several optoelectronic detectors with the identical construction, for example, by a multichannel detector whose channels can be associated with different detection wavelengths and/or sample sections.

If the simultaneous reading out of several detection channels should not be possible, at first an image can be acquired in an analog channel (oversampling). Subsequently, the ranges with low image intensity are selected and only these ranges are rescanned and acquired with the digital evaluation process (SPC, 2D-PC). However, this requires more than one scanning pass and this means an elevated sample load.

It is to be understood that the present invention is not limited to the illustrated embodiments described herein. Modifications and variations of the above-described embodiments of the present invention are possible, as appreciated by those skilled in the art in light of the above teachings.

LIST OF REFERENCE NUMERALS

1 microscope
2 microscopic image with expanded dynamic range
20 collimation lens
21 microscope lens
22 sample
23 laser
24 light flap
25 attenuator
26 fiber coupler
27 tube lens
28 filter
29 dichroic beam divider
30 scanning unit
31 hole diaphragm
32 photomultiplier
33 main beam divider
34 control unit
35 light source
D detection module
L illumination module
M microscope
S scanning module
P optoelectronic converter
$R_{1,2,3}$ sample region

What is claimed is:

1. A method for generating an at least two-dimensional image of at least a part of a sample, the method comprising the steps of:
   scanning the sample;
   acquiring at least one light signal by an optoelectronic detector for different areas of the sample;
   converting the at least one light signal into an electrical signal;
   distributing the electrical signal onto several parallel evaluation channels whose signal evaluations differ from each other in such a manner that their dynamic ranges are different;
   generating a result signal in each evaluation channel; and
   selecting at least one of the result signals as a function of one of the result signals of an evaluation channel in order to generate the image for the sample range concerned.

2. The method according to claim 1, further comprising the steps of generating at least one intermediate result signal of a corresponding evaluation channel, and wherein the selecting step further comprises selecting at least one of the result signals as a function of one of the result signals and/or as a function of an intermediate result signal in order to generate the image for the sample range concerned.

3. The method according to claim 1, in which each sample range for which a selection is carried out corresponds to a particular image element of the image to be generated.

4. The method according to claim 1, wherein selecting takes place during scanning.

5. The method according to claim 1, wherein an evaluation is made for the selection of at least one of the result signals, especially with the determination of a degree of a suitability of the concerned result signal for the generation of the image with expanded dynamic range.

6. The method according to claim 2, wherein an evaluation is made for the selection of at least one of the result signals and/or of at least one of the intermediate result signals, especially with the determination of a degree of a suitability of the concerned result signal and/or intermediate signal for the generation of the image with expanded dynamic range.

7. The method according to claim 1, wherein in order to generate the image with a dynamic range that corresponds to a combining of the dynamic ranges of several evaluation channels exactly one scanning pass is carried out.

8. The method according to claim 1, wherein the selection of the result signal takes place for each sample range using a particular result signal that indicates a photon number.

9. The method according to claim 2, wherein the selection of the result signal takes place for each sample range using a particular result signal that indicates a photon number, and/or using a particular intermediate result signal that indicates a photon number.

10. The method according to claim 1, wherein selecting takes place exclusively as a function of one or more of the result signals.

11. The method according to claim 2, wherein selecting takes place exclusively as a function of one or more of the result signals and/or of one or more of the intermediate result signals.

12. The method according to claim 1, further comprising the steps of determining one signal-to-noise ratio for each result signal for each sample range; and selecting and outputting the result signal that has the lowest signal-to-noise ratio.

13. The method according to claim 1, further comprising the steps of adjusting a gain of the detector or an excitation light intensity of a light source as a function of one of the result signals.

14. The method according to claim 2, further comprising the steps of adjusting a gain of the detector or an excitation light intensity of a light source as a function of one of the result signals and/or as a function of an intermediate result signal.

15. A control unit that is adjusted for carrying out a method in accordance with claim 1.

16. An optical device for generating an at least two-dimensional image of at least a part of a sample, the optical device comprising:

a scanning device for scanning the sample;

an optoelectronic detector for acquiring at least one light signal for different areas of the sample and converting the at least one light signal into an electrical signal with several evaluation channels whose signal evaluations differ;

a division circuit for distributing the electrical signal onto several parallel evaluation channels whose signal evaluations differ from each other in such a manner that their dynamic ranges are different;

means for generating a result signal in each evaluation channel; and means for selecting at least one of the result signals as a function of one of the result signals of an evaluation channel in order to generate the image for the sample range concerned.

17. The device according to claim 16, further comprising:

means for generating at least one intermediate result signal, and wherein the selecting means further includes means for selecting at least one of the result signals as a function of one of the result signals and/or as a function of an intermediate result signal of an evaluation channel in order to generate the image for the sample range concerned.

* * * * *

UNITED STATES PATENT AND TRADEMARK OFFICE
CERTIFICATE OF CORRECTION

| | | |
|---|---|---|
| PATENT NO. | : 8,633,430 B2 | Page 1 of 1 |
| APPLICATION NO. | : 13/435628 | |
| DATED | : January 21, 2014 | |
| INVENTOR(S) | : Gunter Moehler et al. | |

It is certified that error appears in the above-identified patent and that said Letters Patent is hereby corrected as shown below:

On the Title Page item (73)

Change

(73) Assignee: Carl Zeiss "Microscophy" GmbH, Jena (DE)

To be

(73) Assignee: Carl Zeiss --Microscopy-- GmbH, Jena (DE)

Signed and Sealed this
Fifteenth Day of September, 2015

Michelle K. Lee
*Director of the United States Patent and Trademark Office*